United States Patent [19]

Savage, Jr.

[11] Patent Number: 5,440,658

[45] Date of Patent: Aug. 8, 1995

[54] MODULAR FIBER OPTIC CABLE ASSEMBLY

[76] Inventor: John M. Savage, Jr., 538-B Via de la Valle, Solana Beach, Calif. 92075

[21] Appl. No.: 278,246

[22] Filed: Jul. 21, 1994

Related U.S. Application Data

[63] Continuation-in-part of Ser. No. 142,938, Oct. 29, 1993, which is a continuation-in-part of Ser. No. 82,963, Jun. 29, 1993, Pat. No. 5,368,503.

[51] Int. Cl.⁶ .................................................. G02B 6/42
[52] U.S. Cl. ........................................ 385/79; 385/86; 385/88; 385/93
[58] Field of Search ............... 385/53, 55, 56, 60, 385/61, 69, 70, 72, 74, 76–79, 86, 88, 92–94, 138

[56] References Cited

U.S. PATENT DOCUMENTS

| | | | |
|---|---|---|---|
| D. 200,157 | 1/1965 | Vincent | D13/146 |
| 1,747,896 | 2/1930 | Gates | 439/682 |
| 2,042,199 | 5/1936 | Thomas | 362/226 |
| 2,396,725 | 3/1946 | Thomas, Jr. | 439/590 |
| 2,796,593 | 6/1957 | Offerman | 439/683 |
| 2,829,359 | 4/1958 | Ritter | 439/56 |
| 2,949,595 | 8/1960 | Doeleman | 338/70 |
| 2,951,226 | 8/1960 | Gittens | 439/58 |
| 2,977,562 | 3/1961 | Benson | 439/58 |
| 2,999,895 | 9/1961 | Smith | 174/138 G |
| 3,184,536 | 5/1965 | Vincent | 174/138 G |
| 3,335,387 | 8/1967 | Mueller | 439/56 |
| 3,601,786 | 8/1971 | Brubaker | 439/853 |
| 3,621,445 | 11/1971 | Horecky et al. | 439/81 |
| 3,663,931 | 5/1972 | Brown | 439/75 |
| 3,887,803 | 6/1975 | Savage, Jr. | 362/363 |
| 3,975,072 | 8/1976 | Ammon | 439/70 |
| 4,035,681 | 7/1977 | Savage, Jr. | 313/110 |
| 4,195,330 | 3/1980 | Savage, Jr. | 362/226 |
| 4,219,172 | 8/1980 | Murayama | 248/27.3 |
| 4,230,387 | 10/1980 | Zahn | 439/590 |
| 4,398,240 | 8/1983 | Savage, Jr. | 362/311 |
| 4,402,110 | 9/1983 | Savage, Jr. | 16/225 |
| 4,461,537 | 7/1984 | Raymer, II et al. | 385/88 |
| 4,471,414 | 9/1984 | Savage, Jr. | 362/226 |
| 4,491,900 | 1/1985 | Savage, Jr. | 362/230 |
| 4,513,356 | 4/1985 | Mikola | 362/226 |
| 4,691,985 | 9/1987 | Shank et al | 385/79 X |
| 4,711,518 | 12/1987 | Shank et al. | 385/79 |
| 4,727,648 | 3/1988 | Savage, Jr. | 29/839 |
| 4,821,152 | 4/1989 | Lorenzen | 361/767 |
| 4,837,927 | 6/1989 | Savage, Jr. | 29/839 |
| 4,986,625 | 1/1991 | Yamada et al. | 385/55 |
| 4,986,772 | 1/1991 | Fukutani | 439/892 |
| 5,068,771 | 11/1991 | Savage, Jr. | 362/255 |
| 5,071,375 | 12/1991 | Savage, Jr. | 439/853 |
| 5,163,109 | 11/1992 | Okugawa et al. | 385/94 |
| 5,193,099 | 3/1993 | Chou | 385/86 X |
| 5,283,802 | 2/1994 | Hsiung | 385/92 X |
| 5,288,242 | 2/1994 | Muzslay | 439/349 |

FOREIGN PATENT DOCUMENTS

| | | |
|---|---|---|
| 2390032 | 12/1978 | France . |
| 1464176 | 2/1969 | Germany . |
| 2250007 | 5/1974 | Germany . |
| 2918620 | 11/1980 | Germany . |
| 2081516 | 2/1982 | United Kingdom . |

Primary Examiner—John D. Lee
Attorney, Agent, or Firm—William W. Haefliger

[57] ABSTRACT

A hollow connector having a first portion to receive a fiber optics cable and to position end extent of the cable relative to the connector interior; the connector having means thereon to grip the cable and to resist endwise withdrawal of the cable relative to the connector; and a lens unit mountable to a panel and having a lens and a depending skirt attachable to the connector, whereby the light-emitting end of the cable ia maintained in selected spaced relation to the lens.

30 Claims, 7 Drawing Sheets

MODULAR FIBER OPTIC CABLE ASSEMBLY

BACKGROUND OF THE INVENTION

This application is a continuation-in-part of Ser. No. 08/142,938 filed Oct. 29, 1993, which is a continuation-in-part of Ser. No. 08/082,963 filed Jun. 29, 1993 (now U.S. Pat. No. 5,368,503).

This invention relates generally to connection or coupling of lenses to fiber optic cables; and more particularly to a simple, effective connection apparatus with interchangeable components.

There is need for mounting apparatus of the type referred to, and in particular, there is need for such apparatus in which components are easily assembled, end-to-end, and remain assembled, with certain components being interchangeable. Stable mounting of such mounting apparatus to a display panel and/or to a PCB is also desired and needed.

SUMMARY OF THE INVENTION

It is a major object of the present invention to provide improved apparatus meeting the above needs. Basically, the apparatus of the invention comprises:

a) a hollow connector having a first portion to receive a fiber optics cable and to position end extent of the cable relative to the connector interior, b) the connector having means thereon to grip the cable and to resist endwise withdrawal of the cable relative to the connector, c) and a lens unit mountable to a panel and having a lens and a depending skirt attachable to the connector, whereby the light-emitting end of the cable is maintained in selected spaced relation to the lens.

As will be seen, the means to grip the cable may advantageously comprise barb means on the connector, as for example annularly located barbs projecting inwardly at the bore of a tubular connector, and directed forwardly toward the lens unit to block retraction of the cable.

Another object is to provide a telescopic interfit between the lens unit skirt and the connector; and barbs may also be provided on at least one of the skirt and connector to engage and grip the other of these elements to block their relative separation. In this regard, the connector typically has a reduced bore section receiving the cable, and an enlarged bore section receiving the skirt.

Yet another object is to provide another hollow connector having a primary portion coupled to another end of the fiber optics cable, a light source also coupled to the other hollow connector, and an auxiliary lens positioned in the other hollow connector to receive light from the source and to direct light at the other end of the cable.

An additional object is to provide barb means associated with the other hollow connector to grip either or both of the cable other end and the light source, or its mount; and to provide the barb means for example in the form of multiple annular barbs to resist endwise separation of either or both of the cable and light source from the other hollow connector. In this regard, the light source may comprise an LED.

These and other objects and advantages of the invention, as well as the details of an illustrative embodiment, will be more fully understood from the following specification and drawings, in which:

DETAILED DESCRIPTION

Figure 1:
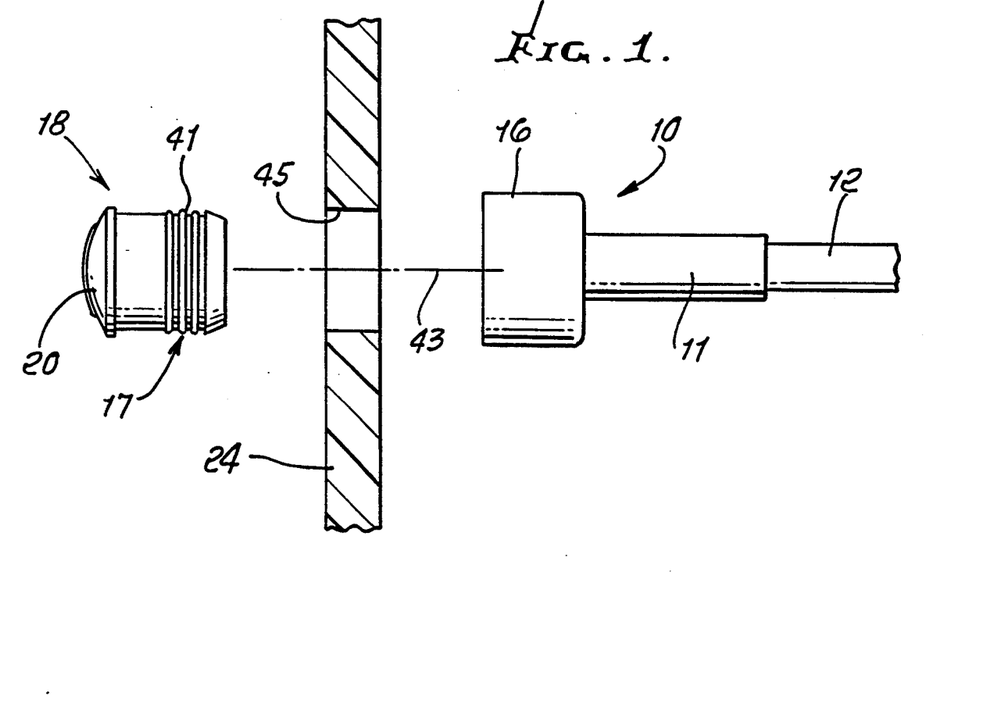
FIG. 1 shows an exploded view of elements including lens unit, panel, connector, and telescopic cable.
Figure 2:
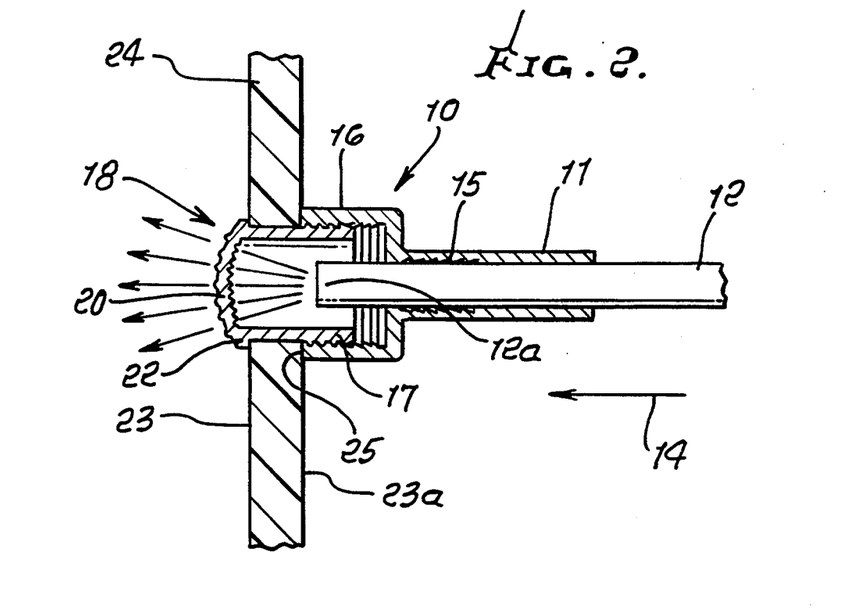
FIG. 2 is like FIG. 1 except that elements are shown in assembled condition.
Figure 3:
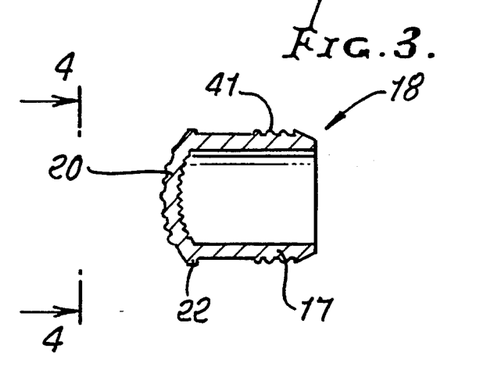
FIG. 3 is an axial section taken through the lens unit of FIGS. 1 and 2.
Figure 4:
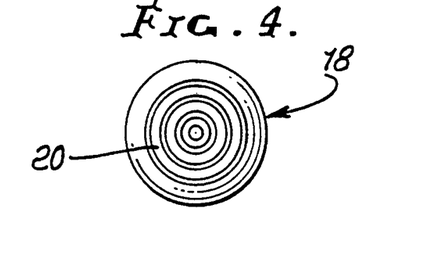
FIG. 4 is an end view of the FIG. 3 lens unit and taken on lines 4—4 of FIG. 3.

As shown in FIGS. 1 and 2, the assembly of elements includes:

a) a hollow connector having a first portion to receive a fiber optics cable and to position end extent of the cable relative to the connector interior, b) the connector having means thereon to grip the cable and to resist or block endwise withdrawal of the cable relative to the connector, c) and a lens unit mountable to a panel and having a lens and a depending skirt attachable to the connector, whereby the light-emitting end of the cable is maintained in selected spaced relation to the lens.

Figure 7:
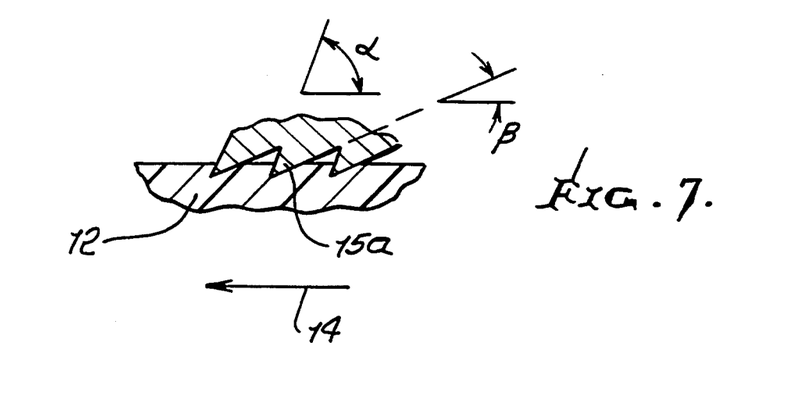
FIG. 7 is an enlarged fragmentary section showing barb tip penetration into plastic sheath cable.

The hollow connector, shown at 10, may be tubular and has a first tubular portion 11 of lesser diameter, to coaxially receive glass fiber optics cable 12. The means on the connector to grip the cable is located at the bore of portion or section 11, in such manner as to resist cable withdrawal. In the example, that grip means, for best results, comprises barb means directed forwardly (direction 14) and also radially inwardly. Such barb means may comprise an axial sequence of annular barbs 15, with forward slopes of angularity $\alpha$, and rearward slopes of angularity $\beta$, where $\beta < \alpha$. See FIG. 7, with barb tips 15a biting into plastic sheath cable 12, as shown.

The connector 10 also has an enlarged bore section 16 telescopically receiving the skirt 17 of the lens unit 18, with predetermined telescopic interfit of 16 and 17 to accurately position and maintain light-emitting end 12a of the cable relative to the lens 20 of the lens unit, i.e., the spacing between 20 and 12a is accurately maintained. The barbs gripping the cable also contribute to this result, since the barbs interfere with positively fix the cable relative to the connector.

Figures 5, 6:
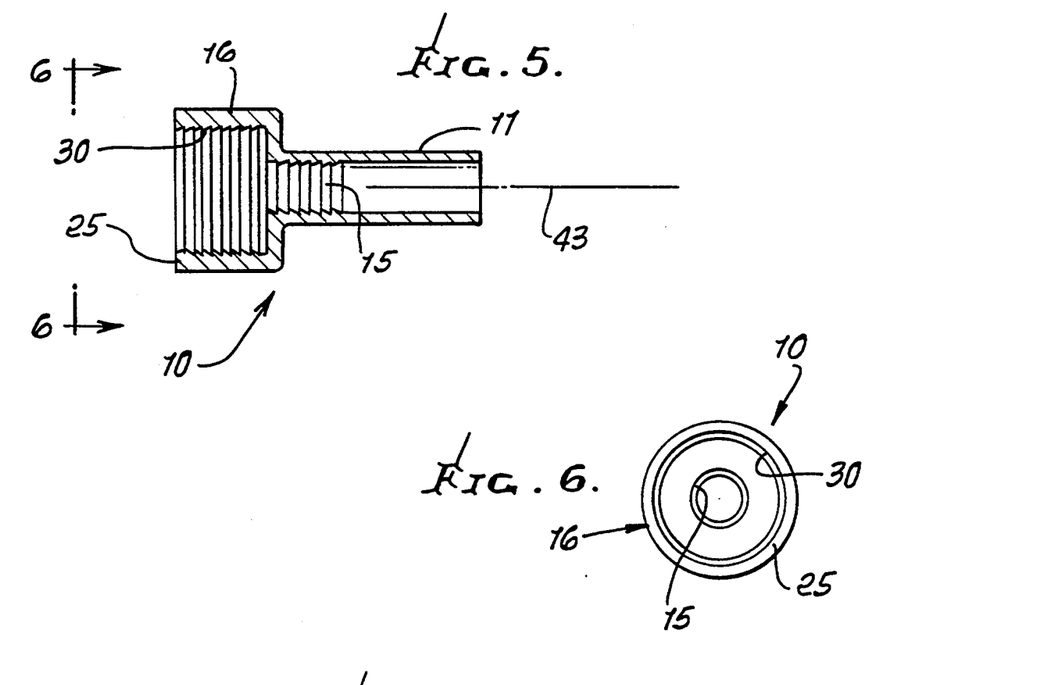
FIG. 5 is an axial section taken through a connector, as seen in FIGS. 1 and 2.
FIG. 6 is an end view of the FIG. 5 connector and taken on lines 6—6 of FIG. 5.

Note in FIG. 2 the lens unit has a flange 22 engaging one wall 23 of the panel 24, and the end 25 of the connector engages the opposite wall 23a of the panel. The connection between 17 and 16 is such as to maintain the axial position of these elements as shown in FIG. 2, and that connection may desirably comprise a second axial sequence of barbs 30 at the bore of 16 (see FIG. 5), and projecting rearwardly and radially inwardly, to bite into plastic skirt 17 and block relative separation of 16 and 17, in the made-up position of the elements seen in FIG. 2.

Accordingly, the combination of elements is extremely easy to push together for make-up, and the combination resists separation from the installed condition, as shown in FIG. 2, so that accuracy of positioning of the cable end and lens is maintained.

The skirt 17 of the lens unit may be formed to have exterior barbs 41 that project forwardly and inwardly, to engage and interlock with barbs 30; or to bite into the bore of the enlarged tubular section 16 to hold it in position. All barbs are annularly located and may extend as annuli about the common axis 13. The panel opening appears at 45, and the panel may comprise a circuit board.

The method of attaching the elements to a panel to fix the end of the cable axially relative to the lens includes: first inserting the fiber optics cable into the connector, to bring the cable end into predetermined spaced and fixed relation to the connector end facing the panel, and then attaching the connector end to the panel by inserting the lens unit skirt through the panel opening to telescopically connect to the connector and to engage the panel.

All elements, except for the cable, typically consist of molded plastic material, the lens being transparent; and the cable consists of a plastic sheath extending over light-transmitting glass fibers.

Figure 8:
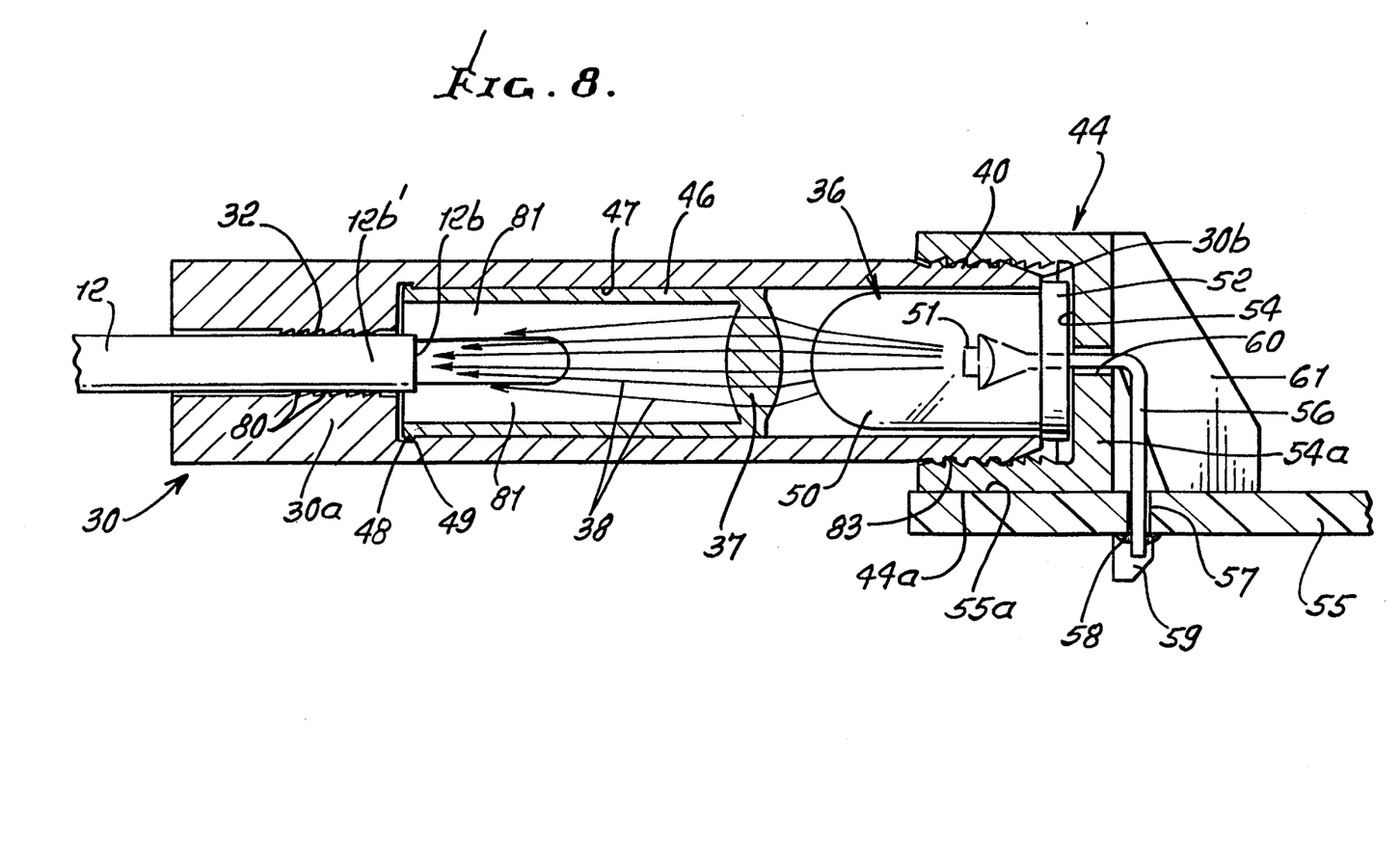
FIG. 8 is a view showing use of an LED and lens to supply light to a fiber optics cable.

Turning to FIG. 8, it shows the other end (light-receiving end 12b) of the glass fiber optics cable 12 coupled to another hollow tubular connector 30. The cable exterior end portion 12b' may in this regard be telescopically received in the end portion 30a of the connector, and grip means is provided at the reduced diameter location 32 to effect gripping of the cable by the connector 30. Such grip means advantageously comprises barb means, such as a series of annularly extending barbs or serrations, as referred to above, at FIG. 7. The barbs 80 bite into the cable sheath and prevent withdrawal of the cable from the connector, while positioning the cable end 12b precisely in relation to a lens 37.

A light source, such as an LED 36, is also coupled to the hollow connector 30, and an auxiliary lens 37 (such as Fresnel lens) is positioned in the hollow connector to receive light from the source 36 and to direct or concentrate light at the end 12b of the cable. See refracted light rays 38. Additional grip means is provided at connector location 40 to grip the bore of the carrier or mount 44 for the LED, and resist axial separation thereof from the connector. Such grip means at 40 typically comprises barb means, such as a series of annularly extending barbs, as referred to above, at FIG. 7. See barbs 40b. Accordingly, the elements 12 and 36 are precisely positioned relative to the lens, by the barb means, to achieve the desired light concentration at the entrance end of the cable.

In this regard, the lens 37 has an associated mount 46 closely received in the bore 42 of the connector 30. A tongue 48, or tongues, on the projecting fingers 80 of the mount 46 is or are snap-received in a corresponding groove 49 in bore 47. Groove 49 may be annular, and the mount 46 may be unitary with the lens, both consisting of molded plastic material. The tongue or tongues 48 may be formed at the end of elongated mount fingers. Accordingly, the lens is precisely positioned axially in the connector, whereas the cable 12 (and its end 12b), and the LED 36 and its carrier, can be axially adjusted, on assembly, to become precisely positioned relative to the lens and held by the barbs.

The LED envelope 50 and emitter 51 are carried by a base flange 52 axially positioned between the connector end 30b, and the inner wall 54 of socket or mount 44. The side 44a of the mount 44 seats at 55a on a circuit board 55; and LED terminals 56 project through openings in the board at 57 to be positioned by soldering at 58. Bayonet-type tongues 59 on the carrier socket 44 project sidewardly to fit into an opening or openings in the board, for stability and connection thereto. See also terminal openings 60 in the socket base 54a and stabilizer struts 61.

Figure 9:
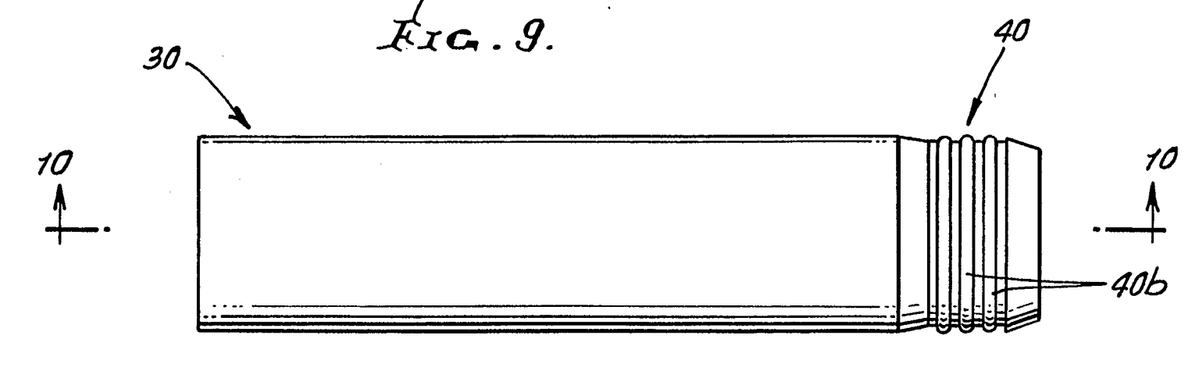
FIG. 9 is a side elevation showing a hollow tubular connection.
Figure 10:
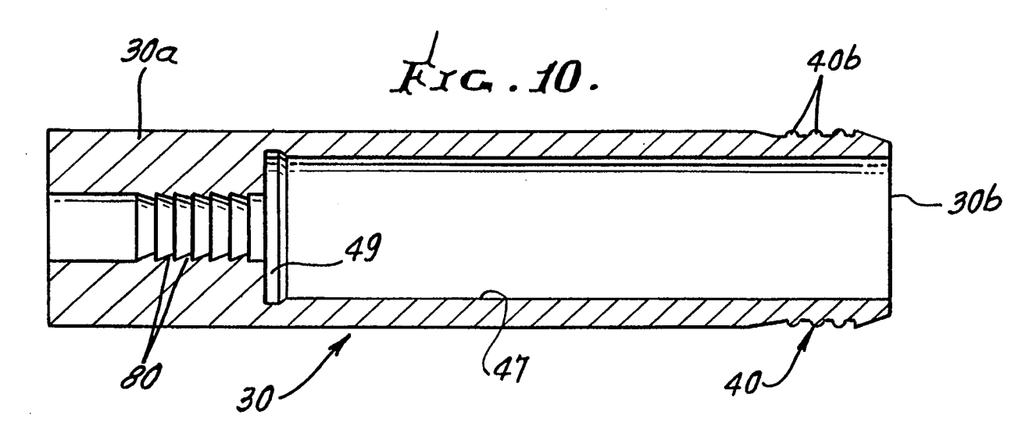
FIG. 10 is an axial section taken through the FIG. 9 connection on lines 10—10.
Figure 11:
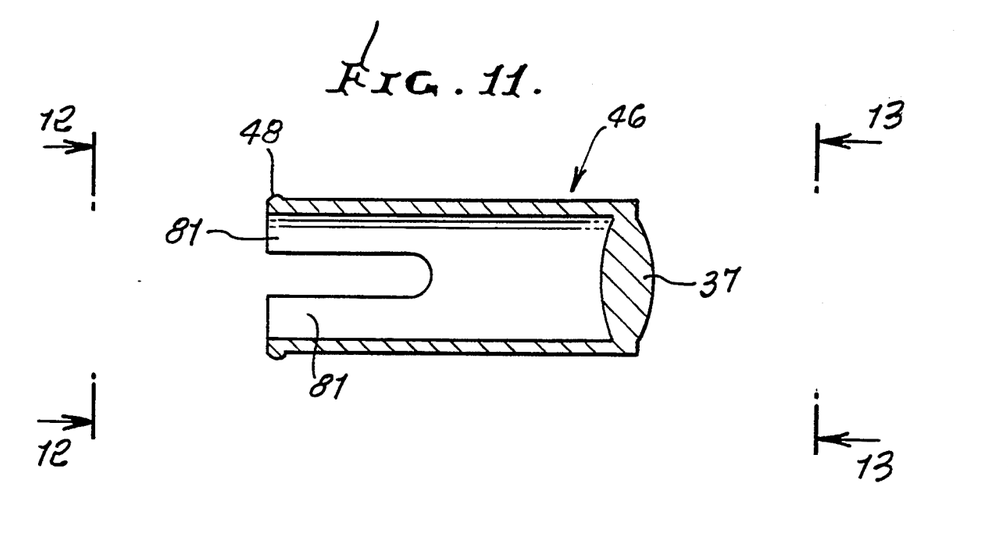
FIG. 11 is a section showing a lens and its tubular mount.
Figure 12:
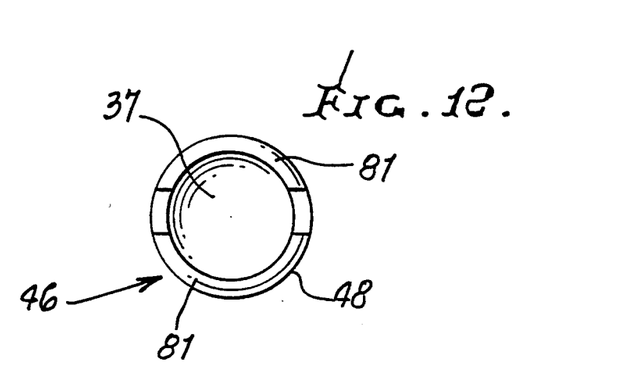
FIG. 12 is an end view taken on lines 12—12 of FIG. 11.
Figure 13:
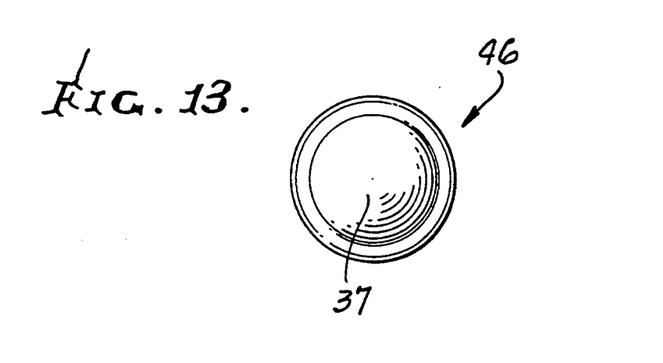
FIG. 13 is an end view taken on lines 13—13 of FIG. 11.
Figure 14:
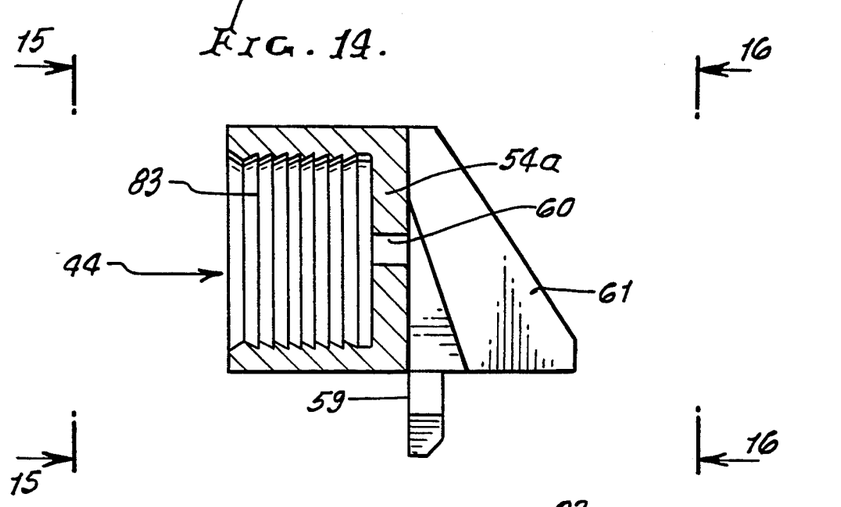
FIG. 14 is a section taken through a socket or carrier, which is also seen in FIG. 8.
Figure 15:
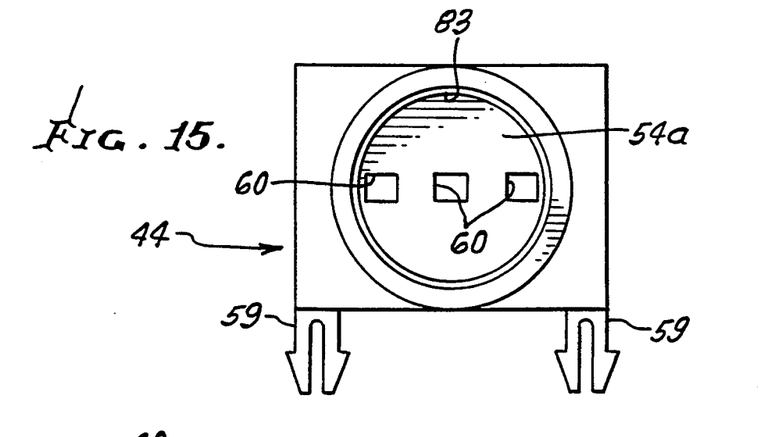
FIG. 15 is an end view taken on lines 15—15 of FIG. 14.
Figure 16:
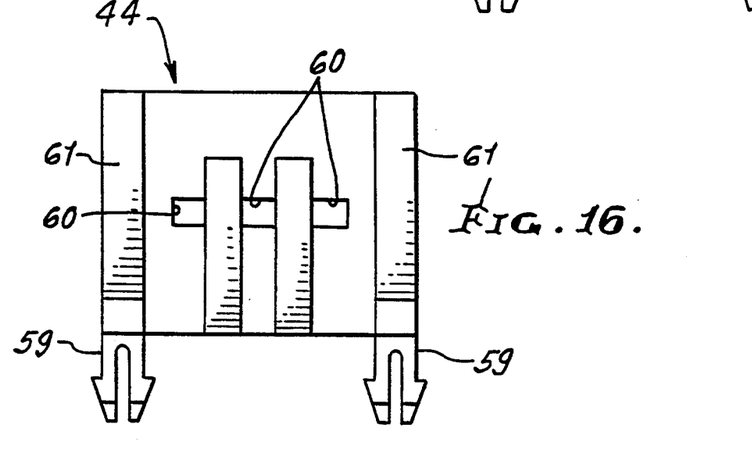
FIG. 16 is an end view taken on lines 16—16 of FIG. 14.

FIGS. 9 and 10 show grooves at 40b to receive barbs or serrations 83 carried at the bore of the socket, as seen in FIG. 14, and like barbs 80 that penetrate the cable sheath.

Figure 17:
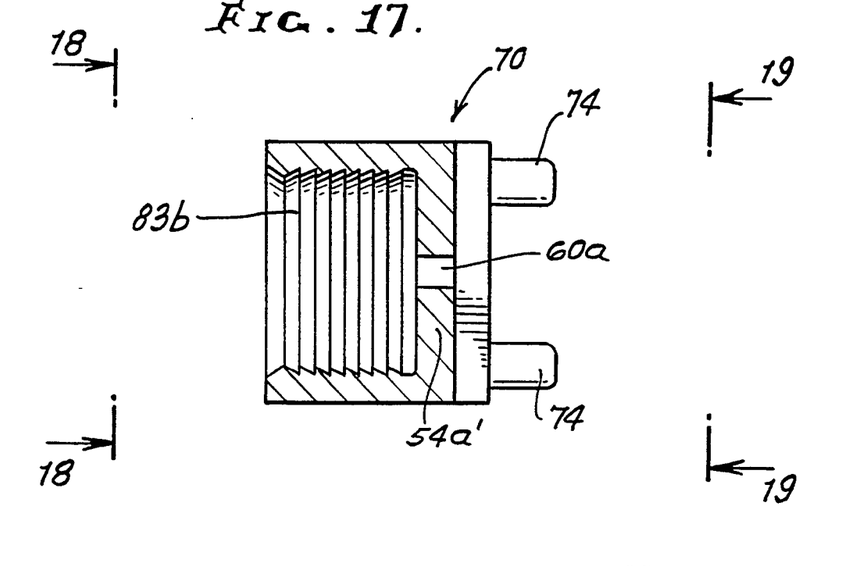
FIG. 17 is a section taken through an alternate carrier.
Figure 18:
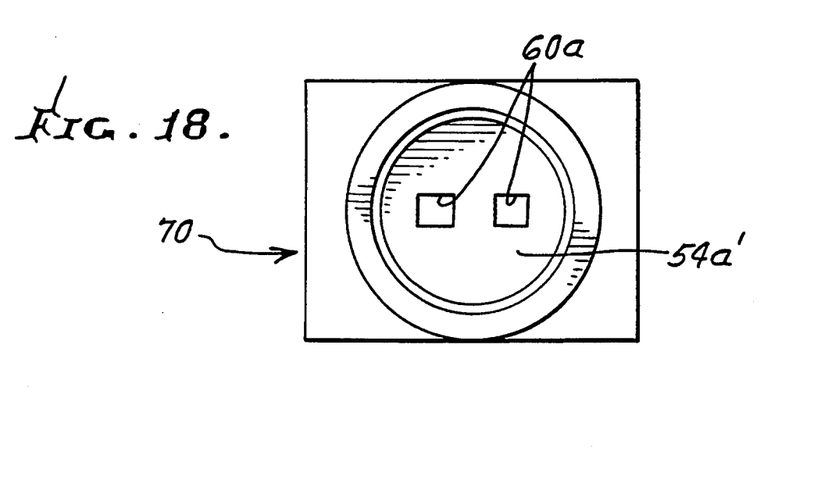
FIG. 18 is an end view taken on lines 18—18 of FIG. 17.
Figure 19:
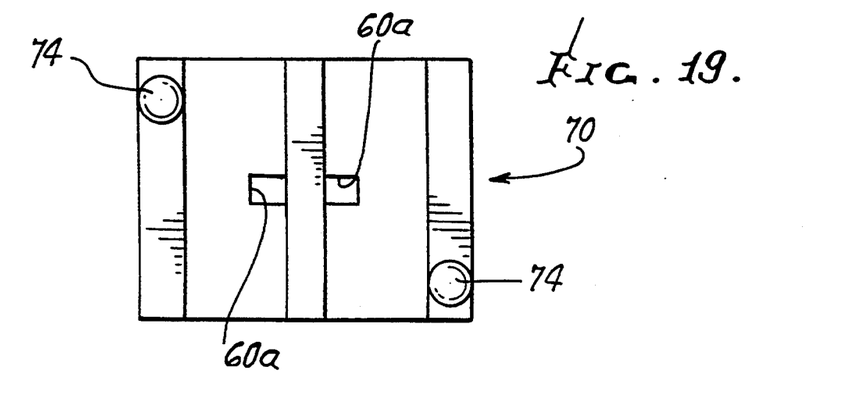
FIG. 19 is an end view taken on lines 19—19 of FIG. 17.

FIGS. 17–19 show a modified socket 70 having barbs at 83b like those in FIG. 14. Two LED terminal openings 60a are formed in end wall 54a'. Tongues 74 project from end wall 54a' to fit in openings in a circuit board, for connection and stability. Thus, the socket 70 may stand endwise on the circuit board, and the LED terminals need not be turned at 90°, as they are in FIG. 8.

I claim:
1. In combination,
 a) a hollow connector having a first portion to receive a fiber optics cable and to position end extent of said cable relative to the connector interior,
 b) the connector having means thereon to grip the cable and to resist endwise withdrawal of the cable relative to the connector,
 c) and a lens unit mountable to a panel and having a lens and a depending skirt attachable to the connector, whereby the end of the cable is maintained in selected openly spaced relation to the lens,
 d) a light source including an LED positioned in openly spaced relation to the lens, and LED mounting means including grip means to resist endwise separation of the LED from the connector.

2. The combination of claim 1 wherein said means to grip the cable comprises barb means on the connector.

3. The combination of claim 1 wherein said lens unit skirt and connector have telescopic interfit.

4. The combination of claim 3 including barb means on at least one of the skirt and connector to resist endwise separation of said skirt and connector.

5. The combination of claim 4 wherein said connector has a reduced bore section receiving the cable, and an enlarged bore section receiving said skirt.

6. The combination of claim 5 wherein said barb means is on said enlarged bore section of the connector.

7. The combination of claim 1 wherein the lens unit and connector define a common axis of interfit, said cable extending axially of said lens unit and connector.

8. The combination of claim 1 including said panel an end of the connector engaging the panel.

9. The method of providing the combination of claim 8 which includes first inserting the fiber optics cable into the connector, to bring the cable end into predetermined spaced and fixed relation to the connector end facing the panel, and then attaching the connector end to the panel by inserting the lens unit skirt through the panel opening to telescopically connect to the connector and to engage the panel.

10. The combination of claim 1 wherein the connector is tubular.

11. The combination of claim 10 wherein said means comprises annularly located barbs projecting forwardly toward the lens unit, and inwardly to grip the cable and block its retraction.

12. The combination of claim 1 wherein said grip means comprises barbs.

13. The combination of claim 12 wherein said barbs extend annularly relative to said LED.

14. In combination,
   a) a connector having a first portion to receive a fiber optics cable and position the end of said cable in the connector,
   b) an LED mount to receive an LED, the mount having structure to telescopically connect to the connector to position the LED in light transmitting relation to said cable end, there being grip means to resist endwise separation of the mount from said connector,
   c) said mount configured for connection to a panel.

15. The combination of claim 14 wherein said panel comprises a circuit board to which the mount is connected.

16. In combination,
   a) a hollow connector having a first portion to receive a fiber optics cable and to position end extent of said cable relative to the connector interior,
   b) the connector having means thereon to grip the cable and to resist endwise withdrawal of the cable relative to the connector,
   c) and a lens unit mountable to a panel and having a lens and a depending skirt attachable to the connector, whereby the light-emitting end of the cable is maintained in selected openly spaced relation to the lens,
   d) the cable having another end, there being another hollow connector having a primary portion coupled to said other end of the cable, a light source also coupled to said other hollow connector, and an auxiliary lens positioned in said other hollow connector to receive light from said source and to direct light at said other end of the cable,
   e) said light source comprising an LED, and an LED socket, and wherein said other connector has additional means thereon to grip said socket to resist endwise separation thereof from said other connector.

17. The combination of claim 16 wherein said other connector has auxiliary means thereon to grip said other end of the cable, and to resist endwise separation thereof from said other connector.

18. The combination of claim 17 wherein said auxiliary means comprises barbs.

19. The combination of claim 18 wherein said barbs extend annularly relative to the cable.

20. The combination of claim 16 wherein said auxiliary lens comprises a Fresnel lens.

21. The combination of claim 16 including a lens mount extending endwise in said other connector, and coupled to the other connector to position the auxiliary lens axially in the other connector.

22. The combination of claim 21 including a coupling tongue on the lens mount, and a coupling groove in the other connector to receive said tongue.

23. The combination of claim 16 wherein said socket has an end wall defining openings to pass LED terminals, and means on the socket to position the socket relative to a circuit board.

24. The combination of claim 23 wherein said LED terminals are turned 90° relative to an axis defined by the socket, to pass through openings in the circuit board.

25. The combination of claims 23 wherein said LED terminals extend in the direction of an axis defined by the circuit board for direct passage through openings in the circuit board.

26. In combination: a fiber optics cable having a light entrance end, a hollow connector coupled to said entrance end of the cable, an LED socket associated with said connector, an LED coupled to said connector via said socket, and a light directing means positioned in said hollow connector to receive light from said LED and to direct light at said end of the cable, there being barb means acting at least in part to provide said coupling, there being grip means to grip said socket to resist separation thereof from said connector.

27. The combination of claim 26 wherein said barb means extends annularly relative to an axis defined by the connector.

28. The combination of claim 27 wherein said barb means includes multiple barbs in an axial series.

29. The combination of claim 28 wherein certain of said barbs extend adjacent the cable and other of said barbs extend adjacent the LED.

30. In combination,
   a) a hollow connector having a first portion to receive a fiber optics cable and to position end extent of said cable relative to the connector interior,
   b) the connector having means thereon to grip the cable and to resist endwise withdrawal of the cable relative to the connector,
   c) and a light directing unit in the connector and attachable to the connector, whereby said end extent of the cable is maintained in selected openly spaced relation to the light directing unit,
   d) an LED and an LED socket coupled to the connector and locating the LED in openly spaced relation to the light directing unit, opposite the cable end extent,
   e) there being grip means to grip said socket to resist endwise separation thereof from the connector.

* * * * *